June 4, 1929.　　A. G. STEINMAYER　　1,715,478
CAP FOR INSULATORS
Filed Jan. 5, 1927

Inventor
Alwin G. Steinmayer
By Ira Milton Jones

Patented June 4, 1929.

1,715,478

UNITED STATES PATENT OFFICE.

ALWIN G. STEINMAYER, OF MILWAUKEE, WISCONSIN, ASSIGNOR TO LINE MATERIAL COMPANY, OF SOUTH MILWAUKEE, WISCONSIN, A CORPORATION OF WISCONSIN.

CAP FOR INSULATORS.

Application filed January 5, 1927. Serial No. 159,112.

This invention relates to certain new and useful improvements in caps for insulators and has as an object the provision of a metal cap adapted to be secured upon insulators of any type to provide means for readily mounting bus bars, supporting brackets, switch mountings and the like.

Another object of this invention resides in the provision of an improved cap of the character described which will permit the adjustment therein of the bolts and the element mounted thereby throughout 360 degrees and which will permit the use of any number of securing bolts.

Another object of this invention resides in the provision of an improved cap of the character described having an annular groove or channel in its top face to receive the substantially square heads of securing bolts having their shanks passed between the flanges to clamp the element to be mounted on the cap.

And a still further object of this invention is to greatly simplify and consequently cheapen the construction of caps of this character.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 1:
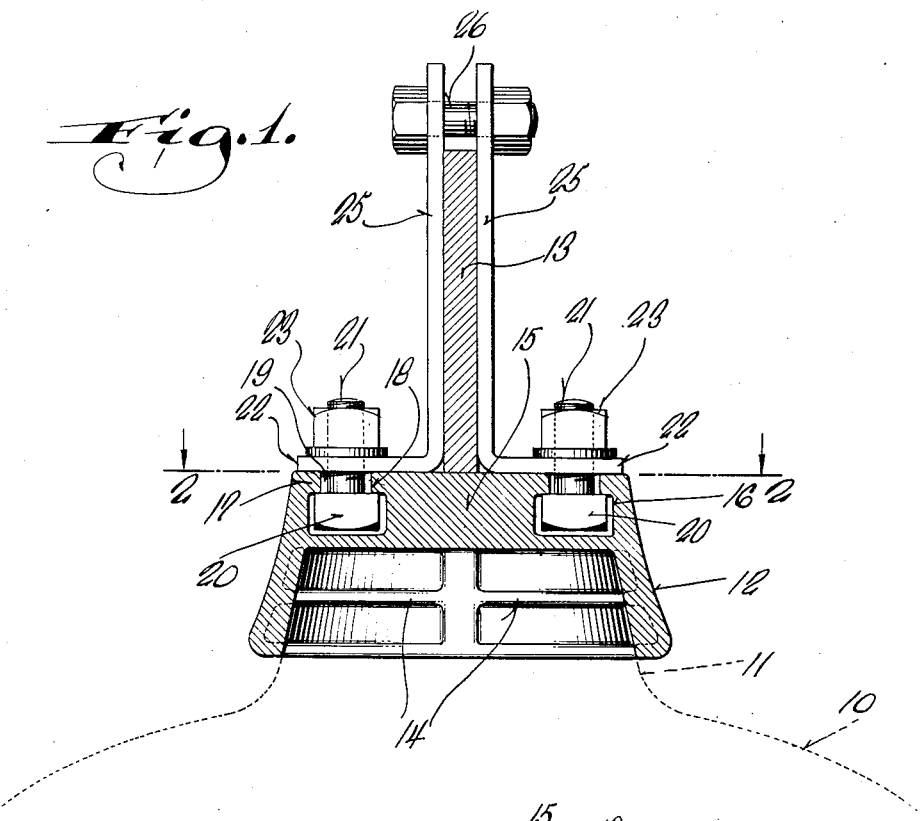
Figure 2:
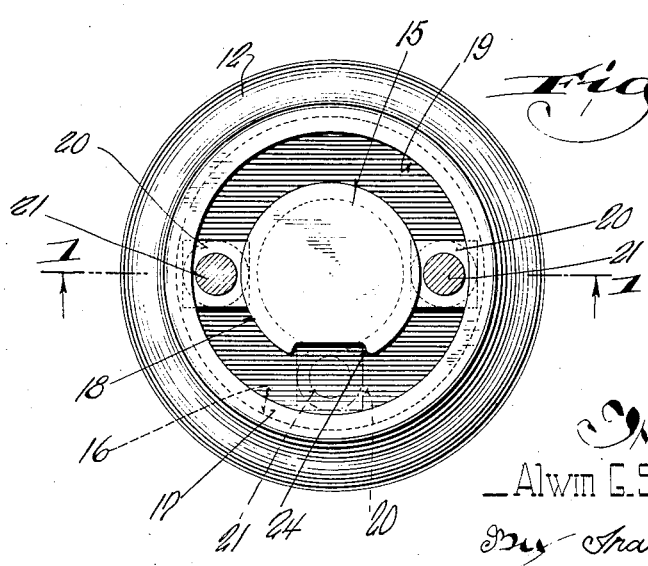

In the accompanying drawing, I have illustrated one complete example of the physical embodiment of my invention constructed according to the best mode I have so far devised for the practical application of the principles thereof, and in which:

Figure 1 is a view, partly in section and partly in elevation, taken transversely through a cap for insulators embodying my invention and illustrating the mounting thereon of a bus bar, said view being taken through Figure 2 on the plane of the line 1—1, and Figure 2 is a top plan view of the cap, with the attaching bolts in section, said view being taken through Figure 1 on the plane of the line 2—2.

In the accompanying drawing, the numeral 10 illustrates in dotted lines an insulator of the petticoat type having a substantially frusto-conical boss or enlargement 11 on its top over which is fitted a cap 12 to provide means for mounting a bus bar or other electrical equipment 13. The cap 12 has its under face recessed to receive the boss 11 and the walls of its recess are ribbed, as at 14, to provide pockets to receive the cement securing the cap fast to the insulator.

The top or base wall 15 of the cap has an annular channel or groove 16 therein into which peripheral flanges 17 and 18 extend to define a narrow groove or channel 19 concentric with the first groove or channel 16, the two channels forming an annular substantially inverted T-shaped slot in transverse section to receive the head 20 of a securing bolt, the shank 21 of which passes outwardly between the flanges 17 and 18 to clamp the base portion 22 of a bracket member between the cap and a nut 23 threaded on the bolt shank.

The flange 18 is cut away at one point 24 a width substantially equal to the width of the bolt head to permit the insertion of the bolt head into the groove in the manner illustrated by dotted lines in Figure 2. In Figure 1, the brackets 22 are illustrated as of the type adapted to mount a bus bar 13 which is clamped between the vertical portions 25 of the brackets by a bolt 26, although it will be appreciated that any type of mounting member may be secured to the cap by one or more bolts 22.

Any number of bolts may be secured in the cap groove and they may be adjusted in the head in any manner as will be readily apparent, thus eliminating the necessity of careful mounting of the insulator and cap with respect to each other as is the case where but a transverse slot is provided radiating from the axis of the cap.

What I claim as my invention is:

1. A cap for insulators having an annular channel in its top wall for receiving a mounting bolt, and means for retaining said mounting bolt in the channel.

2. A cap for insulators having a substantially inverted T-shaped groove formed annularly in the top wall thereof.

3. A cap for insulators having a substantially inverted T-shaped groove formed annularly in the top wall thereof for receiving a headed mounting bolt, and means forming an entrance to the inverted T-shaped groove through which the bolt head may be passed to permit the insertion or removal of the bolt.

4. A cap for insulators having an annular groove in its top, a peripheral flange extended inwardly from the outer wall of the groove, a second peripheral flange extended outwardly from the inner wall of the groove, the groove and peripheral flanges forming an inverted annular T-slot to receive a bolt head with its shank passed between said flanges, and one peripheral flange having a portion cut away to permit the insertion of the bolt head into the groove.

In testimony whereof, I hereunto affix my signature.

ALWIN G. STEINMAYER.